US011905402B2

(12) United States Patent
Yoon et al.

(10) Patent No.: US 11,905,402 B2
(45) Date of Patent: Feb. 20, 2024

(54) POLYOLEFIN RESIN COMPOSITION HAVING HIGH RIGIDITY AND LOW COEFFICIENT OF LINEAR THERMAL EXPANSION AND WEIGHT-REDUCED AUTOMOBILE PART COMPRISING SAME

(71) Applicants: Hyundai Motor Company, Seoul (KR); Kia Corporation, Seoul (KR); Hanwha Total Energies Petrochemical Co., Ltd., Seosan-si (KR)

(72) Inventors: Jin Young Yoon, Gimpo-si (KR); Hee Joon Lee, Seoul (KR); Dong Eun Cha, Hwaseong-si (KR); Sun Jun Kwon, Seoul (KR); Chun Ho Park, Seoul (KR); Seung Ryong Jeong, Seoul (KR); Jeong Gil Ko, Yongin-si (KR); Yoon Hwan Lee, Seoul (KR)

(73) Assignees: HYUNDAI MOTOR COMPANY, Seoul (KR); KIA CORPORATION, Seoul (KR); HANWHA TOTAL ENERGIES PETROCHEMICAL CO., LTD., Seosan-si (KR)

( * ) Notice: Subject to any disclaimer, the term of this patent is extended or adjusted under 35 U.S.C. 154(b) by 9 days.

(21) Appl. No.: 17/810,994

(22) Filed: Jul. 6, 2022

(65) Prior Publication Data
US 2023/0020477 A1    Jan. 19, 2023

(30) Foreign Application Priority Data
Jul. 6, 2021   (KR) ......................... 10-2021-0088630

(51) Int. Cl.
*C08L 23/16*    (2006.01)
*C08L 23/12*    (2006.01)

(52) U.S. Cl.
CPC ............... *C08L 23/16* (2013.01); *C08L 23/12* (2013.01); *C08L 2205/08* (2013.01); *C08L 2207/04* (2013.01)

(58) Field of Classification Search
CPC .... C08L 23/142; C08L 23/12; C08L 23/0815; C08L 23/14; C08L 23/24; C08L 25/08; C08K 3/013; C08K 3/014; C08K 3/34
See application file for complete search history.

(56) References Cited

U.S. PATENT DOCUMENTS 5,829,804 A  * 11/1998  Saeki ...................... B60R 19/03
                                                524/505
2009/0220786 A1*  9/2009  Sita ........................ C08F 297/04
                                                525/203

(Continued)

FOREIGN PATENT DOCUMENTS

JP      2008205266 A    9/2008
JP      2009062526 A    3/2009

(Continued)

*Primary Examiner* — Mark S Kaucher
(74) *Attorney, Agent, or Firm* — MCDONNELL BOEHNEN HULBERT & BERGHOFF LLP (57) ABSTRACT

The present disclosure provides a thermoplastic resin composition having high rigidity and a low coefficient of linear thermal expansion and a molded article including the same. Specifically, the thermoplastic resin composition includes a polypropylene-based resin having an isotactic pentad fraction of 96% or more as measured by $^{13}$C-NMR, a thermoplastic elastomer, an inorganic filler having an average particle diameter of 0.1 μm to 5 μm, and a compatibilizer, and has a flexural modulus of 2,500 MPa or more and a coefficient of linear thermal expansion of 60 μm/m·° C. or less.

18 Claims, 3 Drawing Sheets

(56) References Cited

U.S. PATENT DOCUMENTS

2010/0204381 A1* 8/2010 Heck .................. C08L 23/0815
524/451
2014/0011937 A1* 1/2014 Nagata ................ C08L 23/142
524/451
2018/0319966 A1* 11/2018 Lu ........................... C08K 7/04

FOREIGN PATENT DOCUMENTS

JP         2011071580 A     4/2011
JP         2012207062 A     10/2012

* cited by examiner

POLYOLEFIN RESIN COMPOSITION HAVING HIGH RIGIDITY AND LOW COEFFICIENT OF LINEAR THERMAL EXPANSION AND WEIGHT-REDUCED AUTOMOBILE PART COMPRISING SAME

CROSS-REFERENCE TO RELATED APPLICATIONS

This application claims under 35 U.S.C. § 119(a) the benefit of priority from Korean Patent Application No. 10-2021-0088630, filed on Jul. 6, 2021, the entire contents of which are incorporated herein by reference.

TECHNICAL FIELD

The present disclosure relates to a thermoplastic resin composition having high rigidity and a low coefficient of linear thermal expansion and a molded article including the same.

BACKGROUND

With the trend of increasingly stringent international environmental regulations and fuel economy regulations and the rising price of energy resources, new technologies for the development of materials and parts for automobiles are urgently required from the viewpoints not only of simply improving fuel efficiency but also of increasing competitiveness according to environmental regulations.

A promising way to improve the fuel efficiency of automobiles is weight reduction technology. By reducing the weight thereof, engine efficiency may be improved, and the performance of automobiles may be maximized, whereby it can be expected that increased fuel efficiency will be shown.

The weight reduction of automobiles is broadly divided into weight reduction of materials achieved using hollow materials, weight reduction of materials achieved through foaming, and weight reduction of materials achieved through part thinning.

In general, the weight reduction of materials through thinning is achieved in a manner such that the thinning is carried out while maintaining the physical properties of parts using high-rigidity inorganic fillers such as long fibers, carbon fibers and the like. However, this method results in poor moldability, so the appearance of parts is not uniform during molding, and a problem of poor dimensional stability in the longitudinal and transverse directions may occur.

With the goal of solving this problem, composite polypropylene to which a high-fluidity resin and a high-rigidity inorganic filler are applied may be devised. However, if the injection flowability of the composite polypropylene is too high or too low, flow marks may be formed, and thin parts cannot be manufactured unless an appropriate inorganic filler is used. In particular, polypropylene as a base resin becomes crystallized during melting, molding, and cooling steps of injection molding, and dimensional stability is highly likely to be problematic due to the high shrinkage rate and the high coefficient of linear thermal expansion of polypropylene.

SUMMARY

Accordingly, an objective of the present disclosure is to provide an automobile exterior material having reduced weight through thin-part molding.

Another objective of the present disclosure is to provide a thermoplastic resin composition capable of producing a molded article having excellent mechanical properties such as rigidity and the like while simultaneously exhibiting good dimensional stability.

The objectives of the present disclosure are not limited to the foregoing, and will be able to be clearly understood through the following description and to be realized by the means described in the claims and combinations thereof.

An embodiment of the present disclosure provides a thermoplastic resin composition having high rigidity and a low coefficient of linear thermal expansion, including a polypropylene-based resin having an isotactic pentad fraction of 96% or more as measured by $^{13}$C-NMR, a thermoplastic elastomer including at least two elastomers, an inorganic filler having an average particle diameter of 0.1 μm to 5 μm, and a compatibilizer, in which the thermoplastic resin composition has a flexural modulus (FM) of 2,500 MPa or more and a coefficient of linear thermal expansion (CLTE) of 60 μm/m·° C. or less.

The polypropylene-based resin may have a melt index (230° C., 2.16 kgf) of 30 g/10 min to 150 g/10 min.

The polypropylene-based resin may include at least one selected from the group consisting of homo-polypropylene, a copolymer of propylene and α-olefin having 2 and 4 to 20 carbon atoms, and combinations thereof.

The polypropylene-based resin may have a polydispersity index (PDI) of less than 5.

The thermoplastic elastomer may include at least one selected from the group consisting of a copolymer rubber of ethylene and α-olefin having 3 to 8 carbon atoms, a styrene-olefin-based rubber, and combinations thereof.

The thermoplastic elastomer may have a melt index (190° C., 2.16 kgf) of 1 g/10 min to 5 g/10 min.

The thermoplastic elastomer may include a first elastomer having an intrinsic viscosity of 0.5 dl/g to 1.0 dl/g and a second elastomer having an intrinsic viscosity of 1.5 dl/g to 2.0 dl/g.

The thermoplastic elastomer may include the first elastomer and the second elastomer at a weight ratio of 1:0.5 to 1:2.

The first elastomer may include an ethylene-octene copolymer rubber.

The second elastomer may include an ethylene-butene copolymer rubber.

The inorganic filler may include at least one selected from the group consisting of talc, mica, calcium carbonate, wollastonite, clay, magnesium sulfate, whiskers, and combinations thereof.

The inorganic filler may be surface-treated with an organosilane-based coupling agent.

The compatibilizer may include a styrene-ethylene-butylene-styrene (SEBS) copolymer.

The compatibilizer may have a melt index (230° C., 2.16 kgf) of 2 g/10 min to 6 g/10 min.

The thermoplastic resin composition may include 50 wt % to 80 wt % of the polypropylene-based resin, 1 wt % to 20 wt % of the thermoplastic elastomer, 1 wt % to 30 wt % of the inorganic filler, and 1 wt % to 5 wt % of the compatibilizer.

The thermoplastic resin composition may have a melt index (230° C., 2.16 kgf) of 35 g/10 min to 50 g/10 min.

The thermoplastic resin composition may further include at least one additive selected from the group consisting of an antioxidant, an ultraviolet absorber, a nucleating agent, a coupling agent, a dispersant, a light stabilizer, a processing lubricant, a slipping agent, an antistatic agent, an inorganic pigment, and combinations thereof.

Another embodiment of the present disclosure provides a molded article including the thermoplastic resin composition described above.

The molded article may be at least one automobile exterior material selected from the group consisting of a side sill molding, door molding, fender molding, quarter glass molding, roof rack, side outer garnish, roof molding garnish, back panel molding, tailgate garnish, and combinations thereof.

According to the present disclosure, it is possible to maximize the performance of automobiles by reducing the weight of an automobile exterior material.

In addition, according to the present disclosure, it is possible to obtain a thermoplastic resin composition capable of producing a molded article having excellent mechanical properties such as rigidity and the like while simultaneously exhibiting good dimensional stability.

The effects of the present disclosure are not limited to the foregoing, and should be understood to include all effects that may be reasonably anticipated from the following description.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

The above and other objectives, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

A thermoplastic resin composition having high rigidity and a low coefficient of linear thermal expansion according to the present disclosure includes a high-crystalline polypropylene-based resin as a base resin, a thermoplastic elastomer, an inorganic filler, and a compatibilizer.

The polypropylene-based resin may include at least one selected from the group consisting of homo-polypropylene, a copolymer of propylene and α-olefin having 2 and 4 to 20 carbon atoms, and combinations thereof.

Examples of the α-olefin monomer having 2 and 4 to 20 carbon atoms may include ethylene, 1-butene, 1-pentene, 1-hexene, 4-methylpentene, 1-heptene, 1-octene, 1-decene, and the like. Specifically, the copolymer of propylene and α-olefin monomer having 2 and 4 to 20 carbon atoms may be an ethylene-propylene copolymer. Also, the copolymer of propylene and α-olefin monomer having 2 and 4 to 20 carbon atoms may be an alternating copolymer, a block copolymer, or a random copolymer. Also, the copolymer of propylene and α-olefin monomer having 2 and 4 to 20 carbon atoms may include about 50 wt % or more of a propylene repeating unit, and particularly about 50 wt % to about 90 wt % of a propylene repeating unit. Since the copolymer includes propylene in a relatively large amount, the crystallinity thereof is high, and thus the rigidity of a molded article made of the thermoplastic resin composition may be improved.

The polypropylene-based resin may have an isotactic pentad fraction of 96% or more, as measured by $^{13}$C-NMR. The upper limit of the isotactic pentad fraction is not particularly limited, and may be, for example, 99% or less. As used herein, the term "isotactic pentad fraction as measured by $^{13}$C-NMR" refers to the ratio of isotactic chains in a pentad unit in the molecular chain measured using $^{13}$C-NMR, and is a fraction of propylene monomer units present at the center of a chain in which five propylene monomer units are successively meso-bonded. When the polypropylene-based resin having a pentad fraction within the corresponding range above is used, the mechanical strength and impact resistance of the molded article may be increased.

The polypropylene-based resin may have a melt index (230° C., 2.16 kgf) of 30 g/10 min to 150 g/10 min. When the melt index of the polypropylene-based resin falls within the corresponding range above, the moldability, appearance, and mechanical properties of the molded article may be improved. Specifically, if the melt index of the polypropylene-based resin is less than the above lower limit, the flowability of the thermoplastic resin composition during injection molding may be decreased, and thus processability may be deteriorated. On the other hand, if the melt index thereof exceeds the above upper limit, the balance between the rigidity and impact resistance of the molded article may be broken.

The polypropylene-based resin may have a polydispersity index (PDI) of less than 5. The lower limit of the polydispersity index is not particularly limited, and may be, for example, greater than 1. When the polydispersity index thereof falls within the corresponding range above, the mechanical properties of a molded article made of the thermoplastic resin composition may be increased.

The thermoplastic resin composition may include 50 wt % to 80 wt % of the polypropylene-based resin. If the amount of the polypropylene-based resin is less than 50 wt %, mechanical properties such as flexural modulus and the like of a molded article made of the thermoplastic resin composition may be deteriorated, whereas if the amount thereof exceeds 80 wt %, impact strength or the like may be decreased.

The thermoplastic elastomer is used to increase the impact strength, heat resistance, and moldability of a molded article.

The thermoplastic elastomer may include at least one selected from the group consisting of a copolymer rubber of ethylene and α-olefin having 3 to 8 carbon atoms, a styrene-olefin-based rubber, and combinations thereof. The thermoplastic elastomer may be an alternating copolymer, a block copolymer, or a random copolymer.

The copolymer rubber of ethylene and α-olefin having 3 to 8 carbon atoms may include 20 to 50 wt % of α-olefin.

The α-olefin having 3 to 8 carbon atoms may include at least one selected from the group consisting of 1-propene, 1-butene, 1-pentene, 4-methyl-1-pentene, 1-hexene, 1-heptene, 1-octene, and combinations thereof.

The styrene-olefin-based rubber may include at least one selected from the group consisting of a styrene-ethylene copolymer, a styrene-butylene copolymer, a styrene-ethylene-propylene copolymer, a styrene-isoprene-styrene copolymer, a styrene-butylene-styrene copolymer, a styrene-ethylene-butylene-styrene copolymer, a styrene-ethylene-propylene-styrene copolymer, a styrene-ethylene-ethylene-propylene-styrene copolymer, and combinations thereof.

The thermoplastic elastomer may have a melt index (190° C., 2.16 kgf) of 1 g/10 min to 5 g/10 min. If the melt index thereof is less than 1 g/10 min, the thermoplastic elastomer may not be well dispersed in the thermoplastic resin composition due to poor flowability, whereas if the melt index thereof exceeds the above upper limit, the impact resistance of the molded article may be deteriorated.

The thermoplastic elastomer may be a combination of two elastomers having different intrinsic viscosity values and different types of monomers. Specifically, the thermoplastic elastomer may include a combination of a first elastomer having an intrinsic viscosity of 0.5 dl/g to 1.0 dl/g and an ethylene-octene copolymer rubber and a second elastomer having an intrinsic viscosity of 1.5 dl/g to 2.0 dl/g and an ethylene-butene copolymer rubber. Here, the thermoplastic elastomer may include the first elastomer and the second elastomer at a weight ratio of 1:0.5 to 1:2. When the combination of two elastomers described above is used as the thermoplastic elastomer, the compatibility between the thermoplastic elastomer and the polypropylene-based resin as the base resin may increase, so the thermoplastic elastomer may be uniformly dispersed in a matrix formed of the polypropylene-based resin.

The thermoplastic resin composition may include 1 wt % to 20 wt % of the thermoplastic elastomer. If the amount of the thermoplastic elastomer is less than the above lower limit, the impact strength of the molded article may be decreased, whereas if the amount thereof exceeds the above upper limit, ductility may be increased and thus mechanical properties such as flexural modulus and the like may be deteriorated.

The inorganic filler is used to reduce the weight of a molded article and improve the mechanical rigidity, impact resistance, and dimensional stability thereof.

The inorganic filler may include at least one selected from the group consisting of talc, mica, calcium carbonate, wollastonite, clay, magnesium sulfate, whiskers, and combinations thereof.

The inorganic filler may be surface-treated with an organosilane-based coupling agent. When the inorganic filler modified through surface treatment is used in this way, agglomeration of the inorganic filler may be prevented and compatibility thereof with other components may be increased, thus improving dispersibility. Therefore, even when the inorganic filler is used in a small amount, the rigidity, impact resistance and the like of the molded article may be improved.

The organosilane-based coupling agent may include at least one selected from the group consisting of γ-glycidoxy propyltrimethoxysilane, β-(3,4-epoxycyclohexyl)ethyltrimethoxysilane, vinyltrimethoxysilane, vinyltriethoxysilane, vinyl-tris (2-methoxyethoxy)silane, γ-methacryloxypropyl trimethoxysilane, γ-aminopropyltrimethoxysilane, N-β-(aminoethyl)-γ-aminopropyldimethoxysilane, γ-mercaptopropyl trimethoxysilane, γ-chloropropyltrimethoxysilane, and combinations thereof.

The inorganic filler may have an average particle diameter of 0.1 μm to 5 μm. If the average particle diameter thereof is less than the above lower limit, the compatibility between the polypropylene-based resin and the inorganic filler may be deteriorated, and thus it may be difficult to finely disperse the inorganic filler, thereby causing a problem in which the inorganic filler agglomerates. On the other hand, if the average particle diameter thereof exceeds the above upper limit, the rigidity and impact strength of the molded article may be deteriorated.

The thermoplastic resin composition may include 1 wt % to 30 wt % of the inorganic filler. If the amount of the inorganic filler is less than the above lower limit, the flexural modulus of the molded article may be decreased, whereas if the amount thereof exceeds the above upper limit, the quality of the molded article may be deteriorated from the aspects of low weight, processability, and appearance.

The compatibilizer is used to improve the compatibility between the components described above.

The compatibilizer may include a styrene-ethylene-butylene-styrene (SEBS) copolymer.

The compatibilizer may have a melt index (230° C., 2.16 kgf) of 2 g/10 min to 6 g/10 min.

The thermoplastic resin composition may include 1 wt % to 5 wt % of the compatibilizer. If the amount of the compatibilizer is less than the above lower limit, it may be difficult to obtain the effect of improving compatibility, whereas if the amount thereof exceeds the above upper limit, the impact strength of the molded article may be deteriorated.

The thermoplastic resin composition may further include at least one additive selected from the group consisting of an antioxidant, an ultraviolet absorber, a nucleating agent, a coupling agent, a dispersant, a light stabilizer, a processing lubricant, a slipping agent, an antistatic agent, an inorganic pigment, and combinations thereof.

The amount of the additive is not particularly limited, and may be, for example, 0.1 wt % to 6 wt %.

The antioxidant may include at least one selected from the group consisting of a phenol-based antioxidant, a phosphite-based antioxidant, thiodipropionate, and combinations thereof.

The slipping agent is used to improve scratch resistance by imparting slipperiness to the surface of a molded article using the thermoplastic resin composition. The slipping agent may include at least one selected from the group consisting of a siloxane-based slipping agent, an amide-based slipping agent, and combinations thereof.

The antistatic agent is used to reduce the generation of static electricity due to friction and to ensure that the additive is uniformly dispersed. The antistatic agent may include at least one selected from the group consisting of a low-molecular-weight antistatic agent, a high-molecular-weight antistatic agent, a conductive polymer, and combinations thereof.

In addition, the present disclosure pertains to a molded article produced using the thermoplastic resin composition. The method of manufacturing the molded article is not particularly limited, and may include various methods, such as injection, extrusion, and the like.

The molded article may be at least one automobile exterior material selected from the group consisting of a side sill molding, door molding, fender molding, quarter glass molding, roof rack, side outer garnish, roof molding garnish, back panel molding, tailgate garnish, and combinations thereof.

Also, the molded article is thin and is thus advantageous in view of reducing the weight of exterior materials, and simultaneously exhibits excellent mechanical rigidity, impact resistance, and dimensional stability. For example, the molded article may exhibit excellent mechanical strength and impact resistance even at a thickness of less than about 2.5 mm, or of 2.0 mm to 2.2 mm.

A better understanding of the present disclosure may be obtained through the following examples. These examples are merely set forth to illustrate the present disclosure, and are not to be construed as limiting the present disclosure.

EXAMPLES 1 AND 2 AND COMPARATIVE EXAMPLES 1 TO 3

Respective thermoplastic resin compositions were obtained by mixing components in the amounts shown in Table 1 below. Specifically, the individual components were kneaded using a Super mixer or a ribbon mixer. Pellets were manufactured through water cooling using a twin-screw extruder (manufacturer: SM, diameter: 45 mm) under conditions of a temperature of 180° C. to 220° C., an extruder screw speed of 240 rpm, and a hopper feed speed of 700 rpm. The pellets were molded into samples having a predetermined shape using an injection-molding machine (manufacturer: Nikita, clamping force: 180 tons) set at 220° C.

TABLE 1

| Component | Amount [wt %] | | | | |
| --- | --- | --- | --- | --- | --- |
| | Example 1 | Example 2 | Comparative Example 1 | Comparative Example 2 | Comparative Example 3 |
| Polypropylene-based resin A1 | 55 | 57 | — | 55 | — |
| Polypropylene-based resin A2 | — | — | 55 | — | 55 |
| Thermoplastic elastomer B1 | 10 | 7 | — | 10 | — |
| Thermoplastic elastomer B2 | 5 | 8 | — | 10 | — |
| Thermoplastic elastomer B3 | — | — | 20 | — | 20 |
| Inorganic filler C1 | 25 | 25 | — | — | 25 |
| Inorganic filler C2 | — | — | 25 | 25 | — |
| Compatibilizer | 5 | 3 | — | — | — |

The polypropylene-based resin A1 was an ethylene-propylene block copolymer having an isotactic pentad fraction of 96% or more as measured by $^{13}$C-NMR, a melt index of about 100 g/10 min, and a polydispersity index (PDI) of less than 5.

The polypropylene-based resin A2 was an ethylene-propylene block copolymer having a melt index of about 30 g/10 min and a polydispersity index (PDI) of less than 7.

The thermoplastic elastomer B1 was an ethylene-octene random copolymer having an intrinsic viscosity of about 0.9 dl/g.

The thermoplastic elastomer B2 was an ethylene-butene random copolymer having an intrinsic viscosity of about 1.8 dl/g.

The thermoplastic elastomer B3 was an ethylene-butene random copolymer having an intrinsic viscosity of about 1.0 dl/g.

The inorganic filler C1 was talc surface-treated with an organosilane-based coupling agent and having an average particle diameter of about 1.0 μm.

The inorganic filler C2 was talc having an average particle diameter of about 10 μm.

The compatibilizer was a styrene-ethylene-butylene-styrene (SEBS) copolymer.

TEST EXAMPLE

The physical properties of the molded articles according to Examples 1 and 2 and Comparative Examples 1 to 3 were measured using the following methods and conditions. The results thereof are shown in Table 2 below.

(1) Melt index: Measurement was made according to ASTM D1238. Here, the cylinder temperature was 230° C. and the load was 2.16 kgf.

(2) Flexural modulus: Measurement was made according to ASTM D790. Here, the sample size was 127×12.7×6.4 mm, the span length was 100 mm, and the test speed was 10 mm/min.

(3) IZOD impact strength: Measurement was made according to ASTM D256. Here, the sample size was 63.5×12.7×6.4 mm and a notched sample was used.

(4) Heat deflection temperature: Measurement was made according to ASTM D648. Here, the sample size was 127×12.7×6.4 mm and the stress load was 0.45 MPa.

(5) Coefficient of linear thermal expansion: Measurement was made according to ASTM E831. Here, the sample size was 10×12.7×3.2 mm, and during the test, the temperature was raised at a rate of 5° C./min to measure the coefficient of linear thermal expansion in the range of −30° C. to 30° C.

(6) Dispersibility: A sample having a size of 127×12.7×6.4 mm was cooled in liquid nitrogen, and the fractured cross-section thereof was observed with the naked eye using a scanning electron microscope.

TABLE 2

| Evaluation item | Example 1 | Example 2 | Comparative Example 1 | Comparative Example 2 | Comparative Example 3 |
|---|---|---|---|---|---|
| Melt index [g/10 min] | 38 | 35 | 15 | 30 | 18 |
| Flexural modulus [MPa] | 2,600 | 2,650 | 2,200 | 2,000 | 2,300 |
| IZOD impact strength [J/m] (at room temperature) | 350 | 380 | 210 | 230 | 250 |
| Heat deflection temperature [° C.] | 130 | 130 | 125 | 120 | 125 |
| Coefficient of linear thermal expansion [μm/m · ° C.] | 53 | 55 | 72 | 70 | 68 |

Figure 1:
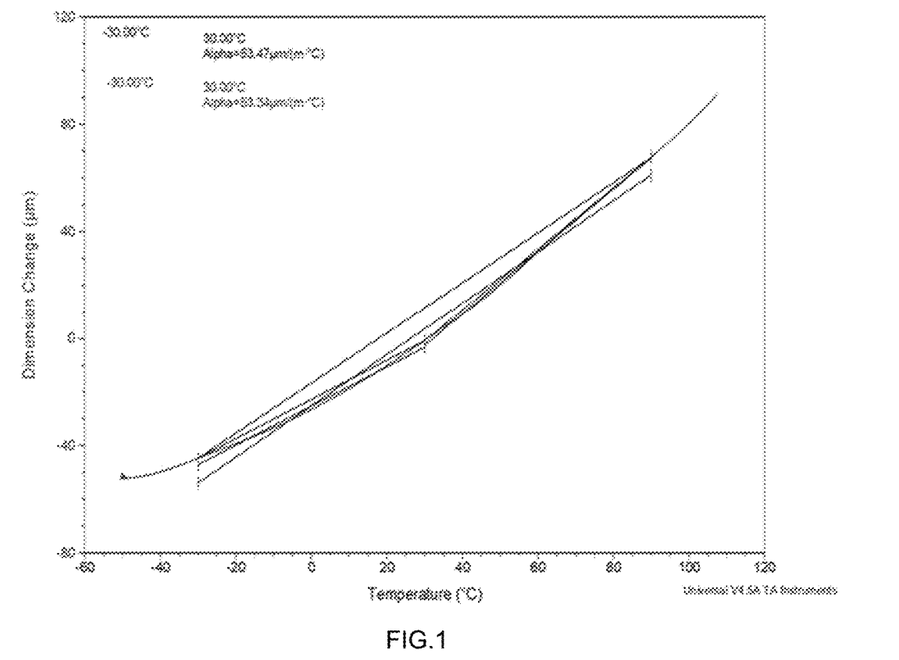
FIG. 1 shows the results of measurement of the coefficient of linear thermal expansion of a sample according to Example 1.
Figure 2:
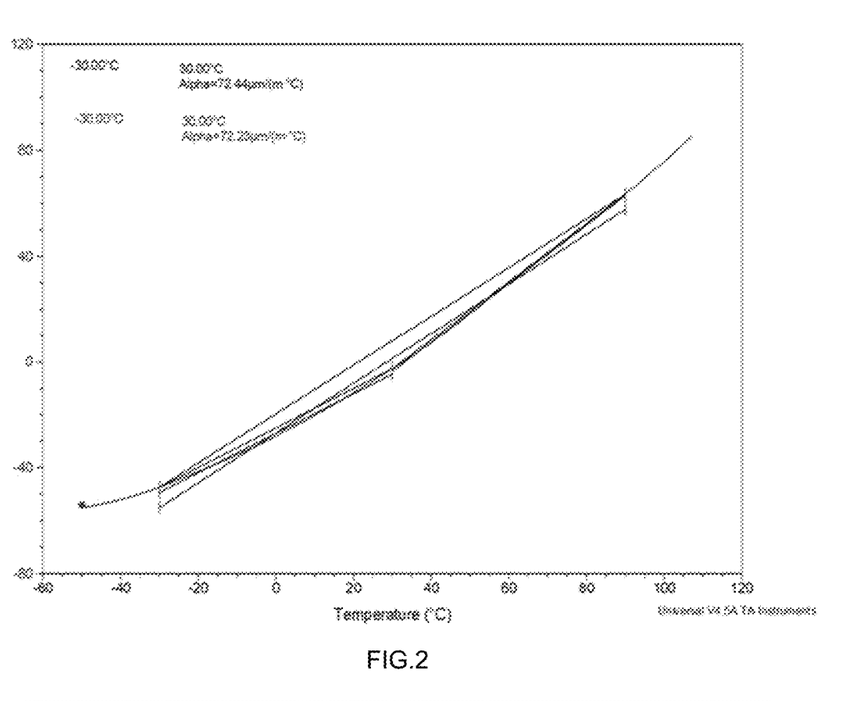
FIG. 2 shows the results of measurement of the coefficient of linear thermal expansion of a sample according to Comparative Example 1.

FIG. 1 shows the results of measurement of the coefficient of linear thermal expansion of Example 1, and FIG. 2 shows the results of measurement of the coefficient of linear thermal expansion of Comparative Example 1.

With reference to Table 2 and FIG. 1, Examples 1 and 2 were superior in all of flexural modulus, impact strength, and coefficient of linear thermal expansion compared to Comparative Examples. Specifically, Examples 1 and 2 exhibited outstanding physical properties, for example, a melt index (230° C., 2.16 kgf) of 35 g/10 min or more, a flexural modulus of 2,500 MPa or more, and a coefficient of linear thermal expansion of 60 μm/m·° C. or less.

Figure 3:
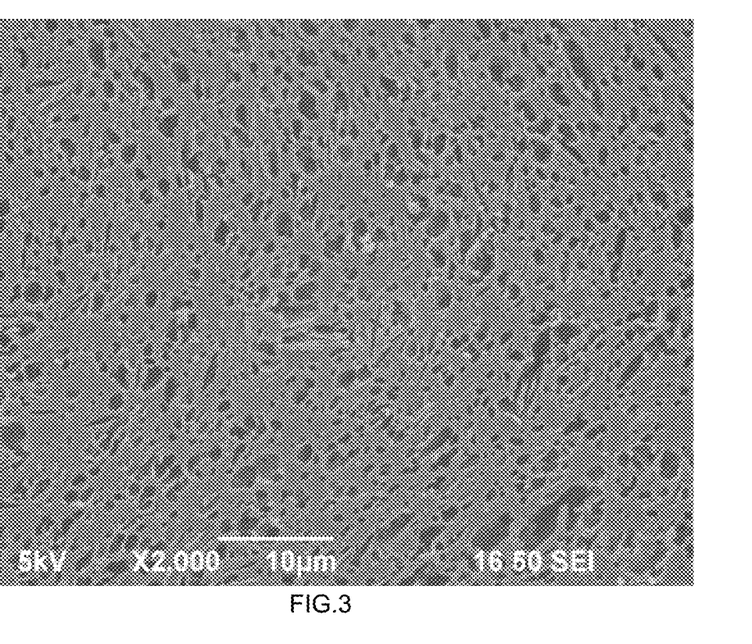
FIG. 3 shows the result of analysis of the dispersibility of the sample according to Example 1 using a scanning electron microscope (SEM)
Figure 4:
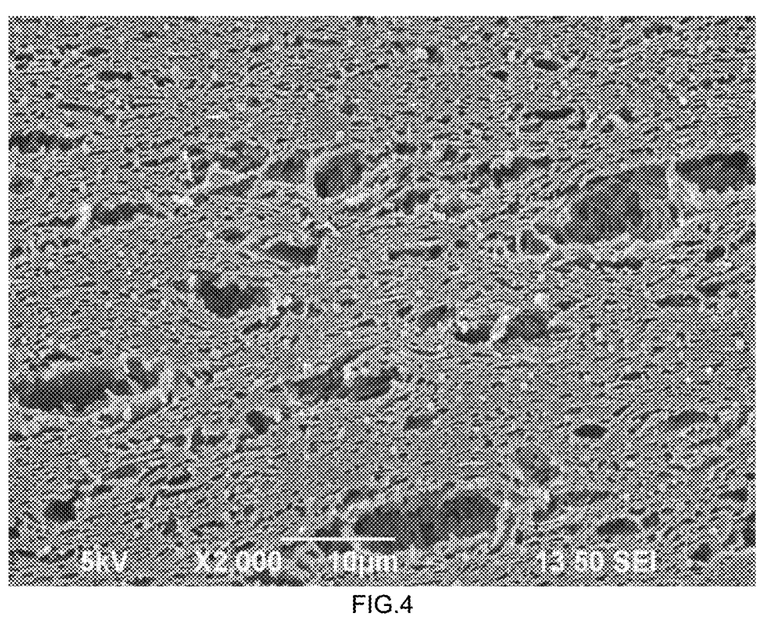
FIG. 4 shows the result of analysis of the dispersibility of the sample according to Comparative Example 1 using a scanning electron microscope (SEM).

Meanwhile, the results of evaluation of dispersibility of the samples of Example 1 and Comparative Example 1 are shown in FIGS. 3 and 4, respectively. With reference thereto, Example 1 exhibited vastly superior dispersibility compared to Comparative Example 1.

Although specific embodiments of the present disclosure have been described with reference to the accompanying drawings, those skilled in the art will appreciate that the present disclosure may be embodied in other specific forms without changing the technical spirit or essential features thereof. Thus, the embodiments described above should be understood to be non-limiting and illustrative in every way.

What is claimed is:

1. A thermoplastic resin composition having a low coefficient of linear thermal expansion, comprising:
   a polypropylene-based resin having an isotactic pentad fraction of 96% or more as measured by $^{13}$C-NMR;
   a thermoplastic elastomer comprising at least two elastomers;
   an inorganic filler having an average particle diameter of 0.1 μm to 5 μm; and
   a compatibilizer,
   wherein the thermoplastic resin composition has a flexural modulus (FM) of 2,500 MPa or more and a coefficient of linear thermal expansion (CLTE) of 60 μm/m·° C. or less,
   wherein the flexural modulus is measured according to ASTM D790 from a molded article of the size of 127×12.7×6.4 mm, a span length of 100 mm and a speed of 10 mm/min,
   wherein the coefficient of linear thermal expansion is measured according to ASTM E831 from a molded article of the size of 10×12.8×3.2 mm, at a rate of 5° C./min and in the range of −30° C. to 30° C., and
   wherein the thermoplastic resin composition having a melt index (230° C., 2.16 kgf) of 35 g/10 min to 50 g/10 min.

2. The thermoplastic resin composition of claim 1, wherein the polypropylene-based resin has a melt index (230° C., 2.16 kgf) of 30 g/10 min to 150 g/10 min.

3. The thermoplastic resin composition of claim 1, wherein the polypropylene-based resin comprises at least one selected from the group consisting of homo-polypropylene, a copolymer of propylene and α-olefin having 2 and 4 to 20 carbon atoms, and combinations thereof.

4. The thermoplastic resin composition of claim 1, wherein the polypropylene-based resin has a polydispersity index (PDI) of less than 5.

5. The thermoplastic resin composition of claim 1, wherein the thermoplastic elastomer comprises at least one selected from the group consisting of a copolymer rubber of ethylene and α-olefin having 3 to 8 carbon atoms, a styrene-olefin-based rubber, and combinations thereof.

6. The thermoplastic resin composition of claim 1, wherein the thermoplastic elastomer has a melt index (190° C., 2.16 kgf) of 1 g/10 min to 5 g/10 min.

7. The thermoplastic resin composition of claim 1, wherein the thermoplastic elastomer comprises a first elastomer having an intrinsic viscosity of 0.5 dl/g to 1.0 dl/g and a second elastomer having an intrinsic viscosity of 1.5 dl/g (decalin at 135° C.) to 2.0 dl/g (decalin at 135° C.).

8. The thermoplastic resin composition of claim 7, wherein the thermoplastic elastomer comprises the first elastomer and the second elastomer at a weight ratio of 1:0.5 to 1:2.

9. The thermoplastic resin composition of claim 7, wherein the first elastomer comprises an ethylene-octene copolymer rubber.

10. The thermoplastic resin composition of claim 7, wherein the second elastomer comprises an ethylene-butene copolymer rubber.

11. The thermoplastic resin composition of claim 1, wherein the inorganic filler comprises at least one selected from the group consisting of talc, mica, calcium carbonate, wollastonite, clay, magnesium sulfate, whiskers, and combinations thereof.

12. The thermoplastic resin composition of claim 1, wherein the inorganic filler is surface-treated with an organosilane-based coupling agent.

13. The thermoplastic resin composition of claim 1, wherein the compatibilizer comprises a styrene-ethylene-butylene-styrene (SEBS) copolymer.

14. The thermoplastic resin composition of claim 1, wherein the compatibilizer has a melt index (230° C., 2.16 kgf) of 2 g/10 min to 6 g/10 min.

15. The thermoplastic resin composition of claim 1, comprising:
   50 wt % to 80 wt % of the polypropylene-based resin;
   1 wt % to 20 wt % of the thermoplastic elastomer;
   1 wt % to 30 wt % of the inorganic filler; and
   1 wt % to 5 wt % of the compatibilizer.

16. The thermoplastic resin composition of claim 1, further comprising at least one additive selected from the group consisting of an antioxidant, an ultraviolet absorber, a nucleating agent, a coupling agent, a dispersant, a light stabilizer, a processing lubricant, a slipping agent, an antistatic agent, an inorganic pigment, and combinations thereof.

17. A molded article comprising the thermoplastic resin composition of claim 1.

18. The molded article of claim 17, wherein the molded article is at least one automobile exterior material selected from the group consisting of a side sill molding, door molding, fender molding, quarter glass molding, roof rack, side outer garnish, roof molding garnish, back panel molding, tailgate garnish, and combinations thereof.

* * * * *